United States Patent
Takahashi et al.

[11] Patent Number: 6,165,055
[45] Date of Patent: Dec. 26, 2000

[54] OPTICAL FIBER END SURFACE POLISHING APPARATUS

[75] Inventors: Mitsuo Takahashi; Kunio Yamada, both of Matsudo; Naotoshi Shiokawa, Kamagaya, all of Japan

[73] Assignee: Seikoh Giken Co., Ltd., Matsudo, Japan

[21] Appl. No.: 09/390,698

[22] Filed: Sep. 7, 1999

[30] Foreign Application Priority Data

Sep. 14, 1998 [JP] Japan .................................. 10-260332

[51] Int. Cl.[7] .................................................. B24B 49/00
[52] U.S. Cl. ............................ 451/278; 451/279; 451/41
[58] Field of Search ................................ 451/41, 42, 278, 451/279, 384, 390

[56] References Cited

U.S. PATENT DOCUMENTS

| | | | |
|---|---|---|---|
| 4,513,537 | 4/1985 | Spurling et al. | 451/390 X |
| 4,905,415 | 3/1990 | Moulin | 451/390 X |
| 4,967,518 | 11/1990 | Moulin | 451/279 X |
| 4,979,334 | 12/1990 | Takahashi . | |
| 5,547,418 | 8/1996 | Takahashi | 451/279 |
| 6,039,630 | 3/2000 | Chandle et al. | 451/278 X |

*Primary Examiner*—David A. Scherbel
*Assistant Examiner*—Anthony Ojini
*Attorney, Agent, or Firm*—Venable; Robert J. Frank; Gabor J. Kelemen

[57] ABSTRACT

A polishing holder arm includes a polishing holder mounting/dismounting device having a base section supported by a base plate through a horizontally rotational shaft to permit the device to rotate and move upward from an approximately horizontal position and the other end section engaged with the polishing holder H. The holder H includes a coupling section whose rotation is restricted by the polishing holder arm and which is detachably coupled with the polishing holder mounting/dismounting device at a center. A polishing force applying device A moves between a position where it applies a downward spring urging force to the polishing holder arm and a position where it permits the polishing holder arm to rotate and move upward. With this arrangement, the optical fiber end surface polishing device causes the polishing holder H to be easily mounded and dismounted on and from the polishing holder arm; can adjust a polishing force double and permits the polishing holder arm to jump upward and rotate at least 90° from an approximately horizontal position.

5 Claims, 7 Drawing Sheets

OPTICAL FIBER END SURFACE POLISHING APPARATUS

BACKGROUND OF THE INVENTION

1. Field of the Invention

The present invention relates to an optical fiber end surface polishing apparatus for polishing the end surface of an optical fiber attached to a ferrule. More specifically, the present invention relates to a novel optical fiber end surface polishing apparatus capable of being easily handled by taking the operability of the apparatus into consideration.

2. Description of the Related Art

One of the inventors of the present invention has proposed the optical fiber end surface polishing apparatus disclosed in U.S. Pat. No. 4,979,334. The optical fiber end surface polishing apparatus according to the invention is arranged such that the end surface of a ferrule with an optical fiber is pressed against an elastic polishing device which makes a composite circular motion by turning on its own axis and revolving around some other axis so that the end surface of the ferrule with the optical fiber can be polished and molded to a flat surface, right angle spherical surface or inclined spherical surface. At present, the apparatus is widely used.

In the optical fiber end surface polishing apparatus according to the above patent, a mechanism for applying a polishing force to the end surface of a ferrule with an optical fiber attached to a polishing holder is disposed in relation to a polishing holder mounting shaft. That is, the polishing force applying mechanism adjusts the polishing force of the polishing holder mounting shaft which contains a polishing force adjusting mechanism to a prescribed value, inserts a polishing holder guide shaft into a guide hole formed to the center of the polishing holder, and applies the polishing force through the center of the polishing holder.

Figure 12:
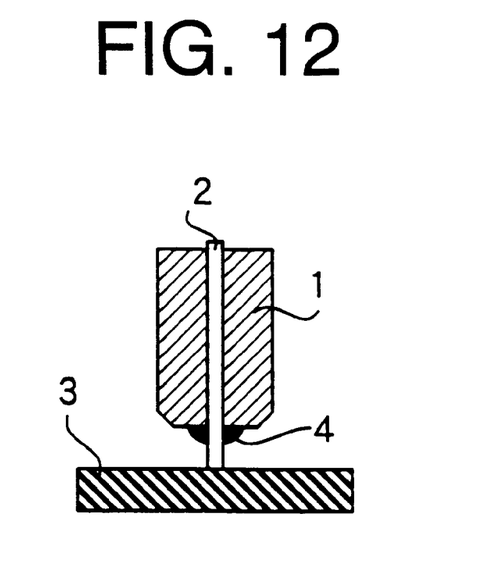
FIG. 12 is a schematic view showing a relationship between the extreme end of an optical fiber and a polishing device before the start of polishing.
Figure 13:
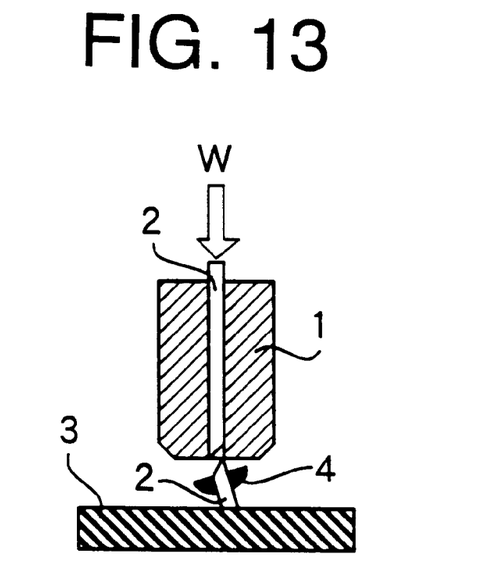
FIG. 13 is a schematic view showing a relationship between the extreme end of the optical fiber and the polishing device to explain a problem when a force is applied at the start of polishing.

A problem arising in an adhesive removing process for removing an adhesive used to adhere an optical fiber to a ferrule will be described with reference to FIG. 12 and FIG. 13. As shown in FIG. 12, in a conventional optical fiber end surface polishing apparatus, a regular polishing force W may be applied to the extreme end of an optical fiber 2 attached to a ferrule 1 in the adhesive removing process which is the first process in polishing as shown in FIG. 13. In such a case, when a polishing film 3 is pressed against the optical fiber 2, an adhesive 4 is exfoliated from the end surface of the ferrule 1. At the time, the extreme end of the optical fiber 2 is irregularly damaged with ease as shown in FIG. 13.

To cope with the above problem, the adhesive removing process is performed with a polishing force in a fraction of the regular polishing force W using a polishing device prepared separately so that the adhesive is manually removed. Further, in the optical fiber end surface polishing apparatus of the embodiment, when it is necessary to adjust a polishing force in order to adjust the radius of curvature of a polishing surface and improve optical quality, a polishing force set once must be adjusted each time the adjustment is required. Thus, a complex adjusting job is necessary to readjust the polishing force of the polishing holder mounting shaft to a prescribed value.

There has been known an optical fiber end surface polishing apparatus of a type employing an air cylinder as another polishing force adjusting means. In such an apparatus, however, attendant devices such as an air compressor, air cleaner, air pressure regulator, air piping and the like and a space where they are installed are necessary. Thus, there is a problem that maintenance and management are made complex as well as a large installation area is required.

In an ordinary ferule with optical fiber polishing process, an optical fiber is polished with a polishing film having a rough mesh first and thereafter sequentially polished with a polishing film having a medium mesh, a polishing film having a fine mesh and finally mirror-finished with a polishing film having ultra-fine abrasive grains. A polishing holder is removed from a polishing device in each polishing process to remove and clean exfoliated abrasive grains and polished chips deposited on the extreme end surface of a ferrule and at the same time the polished surface of the optical fiber is visually checked as a mid-process inspection and then the ferrule is transferred to the polishing job of the next process. Accordingly, the conventional optical fiber end surface polishing apparatus mounts and dismounts the polishing holder 8 times in total.

A main object of the present invention is to provide an optical fiber end surface polishing apparatus for solving the technical problems to improve and enhance the workability of the conventional optical fiber end surface polishing apparatus mentioned above.

Another object of the present invention is to provide an optical fiber end surface polishing device capable of easily mounting and dismounting a polishing holder on and from a polishing holder arm by engaging a key block mounted on the polishing holder arm with the peripheral groove of the polishing holder by rotating the key block forward and rearward 90° as a means for mounting and dismounting the polishing holder on and from the polishing holder arm.

Still another object of the present invention is to provide an optical fiber end surface polishing apparatus having a double polishing force adjusting mechanism for adjusting polishing force double which is composed of a primary polishing force applying device as a primary polishing force applying means, which employs a coil spring disposed above the upper surface of a block member mounted on the upper surface of a base plate, and a pin which is horizontally rotatably disposed to the outer periphery of the primary polishing force applying device and applies a polishing force by being engaged with a secondary polishing force adjusting surface having a plurality of steps.

A further object of the present invention is to provide an optical fiber end surface polishing apparatus which permits a polishing holder arm to rotate and jump upward at least 90° from an approximately horizontal position.

To this end, according to one aspect of the present invention, there is provided an optical fiber end surface polishing apparatus composed of a polishing device surface turning by being supported by a base plate, a holder for supporting a plurality of optical fiber ferrules, a polishing holder arm capable of moving relative to the polishing device surface while supporting the holder and a polishing force applying device for applying a pressure for making the ferrules to come into contact with the polishing device surface under pressure through the polishing holder arm, wherein the polishing holder arm includes a polishing holder mounting/dismounting device having a base section supported by the base plate through a horizontally rotational shaft to permit the device to rotate and move upward from an approximately horizontal position and the other end section engaged with the polishing holder, the holder includes a coupling section whose rotation is restricted by the polishing holder arm and which is detachably coupled with the polishing holder mounting/dismounting device at a center, and the polishing force applying device includes polishing force applying means which moves between a position where it applies a downward spring urging force to the polishing holder arm and a position where it permits the polishing holder arm to rotate and move upward.

The polishing holder is composed of a stepped disc member having a cylindrical section formed at the center thereof, adapters disposed on the same radius of the thin outside edge section formed to the stepped disc member for attaching the plurality of optical fiber ferrules thereto, an U-shaped mounting/guiding groove formed longitudinally to the interior of the cylindrical section and a peripheral groove formed to the interior of the cylindrical section at angles to an axis and communicating with the mounting/guiding groove.

The polishing holder arm includes the polishing holder mounting/dismounting device which can be jumped upward and rotated at least 90° from the approximately horizontal position through the horizontally rotational shaft disposed to an end of a rectangular member mounted on the base plate and detachably mount the polishing holder thereon through the rotational key at the other end thereof which is engaged and disengaged with and from the peripheral grove of the polishing holder.

The polishing force applying device includes a block member mounted on the upper surface of the base plate and having a vertical stepped hole and a vertical screw hole formed coaxially to the upper surface of the block member, a polishing force adjusting knob having a rod disposed to the axial center thereof and engaged with the screw hole, a rotatable nut having a polishing force applying pin horizontally disposed to the outside diameter surface thereof and capable of rotating horizontally and a compressed coil spring interposed between the polishing force adjusting knob and the rotational nut and the assembly of these components is attached to the stepped hole and the screw hole.

The polishing force applying device is arranged such that a mounting/guiding groove and a horizontally rotating shaft hole are formed to the polishing holder arm, the polishing holder arm is attached to the mounting/guiding groove as well as the polishing force applying pin is engaged with any one of a plurality of steps on the adjusting surface formed on the upper surface of the polishing holder arm.

DESCRIPTION OF THE PREFERRED EMBODIMENTS

Figure 1:
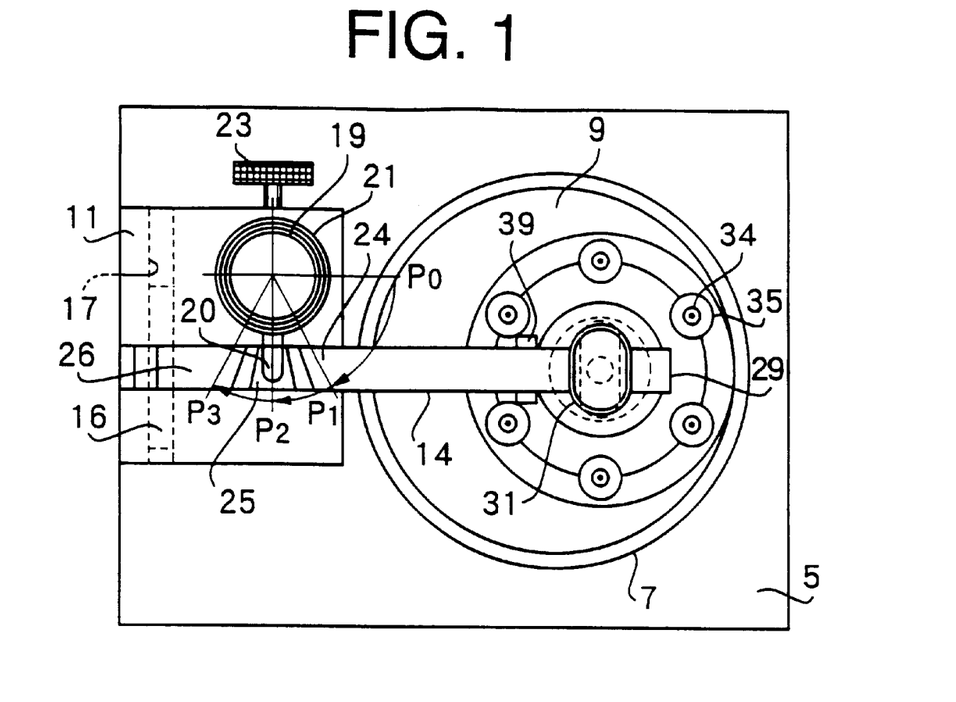
FIG. 1 is a plan view of an embodiment of an optical fiber end surface polishing apparatus according to the present invention.
Figure 2:
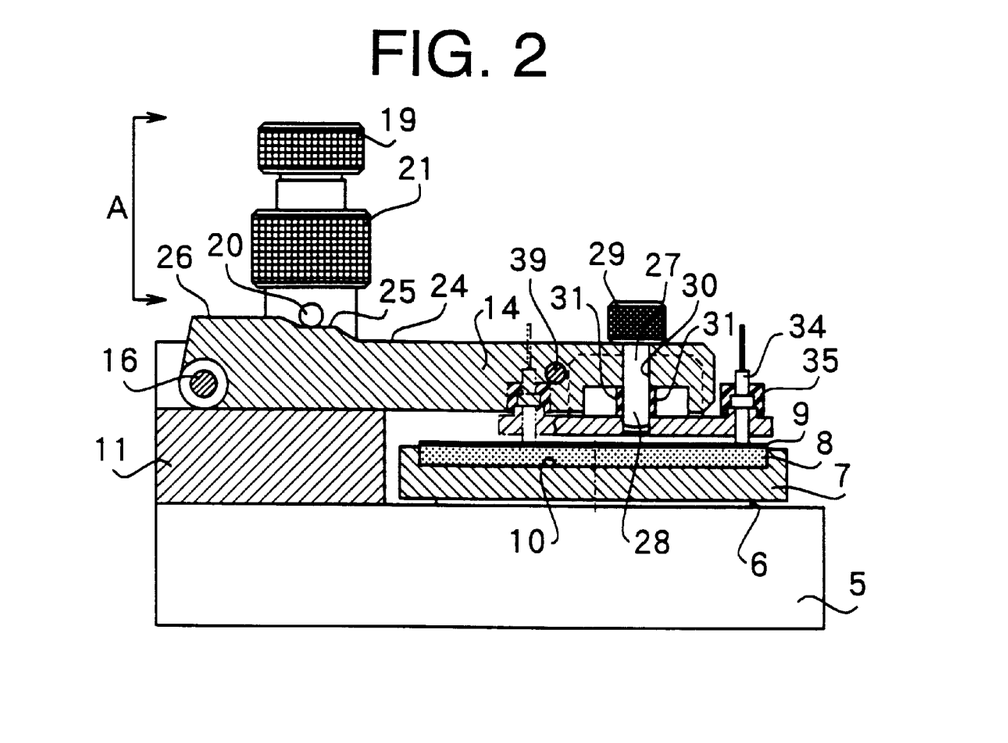
FIG. 2 is a side sectional view of the embodiment.
Figure 3:
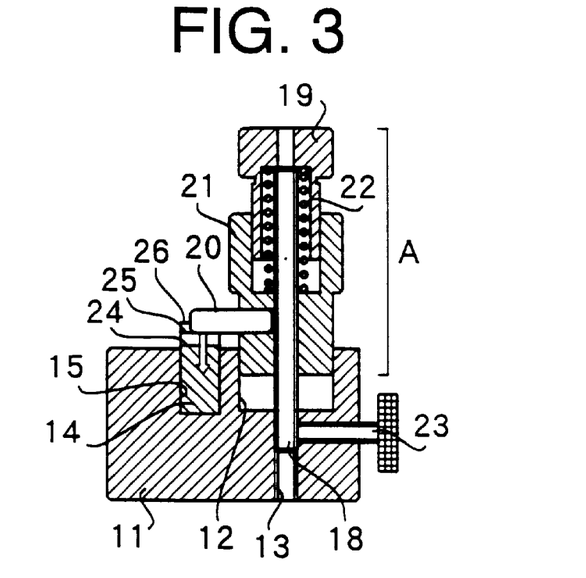
FIG. 3 is a front sectional view of a primary polishing force applying device of the apparatus of the embodiment.

Embodiments of an optical fiber end surface polishing apparatus according to the present invention will be described below in more detail with reference to the accompanying drawings and the like. FIG. 1 is a plan view of an embodiment of the optical fiber end surface polishing apparatus according to the present invention, FIG. 2 is a side sectional view of the embodiment and FIG. 3 is a front sectional view of a primary polishing force applying unit A of the apparatus of the embodiment. A turntable 7 is disposed above the upper surface of the base plate 5 of the embodiment of the optical fiber end surface polishing apparatus according to the present invention through a thrust plate 6. A polishing device is composed of an elastic disc 8 made of synthetic rubber or the like and a polishing film 9 disposed on the upper surface of the elastic disc 8. Since the polishing device is only placed on the seat surface 10 of the turntable 7, it can be easily replaced.

A block member 11 is mounted on the base plate 5, a stepped hole 12 and a screw hole 13 each having a circular cross section are formed from the upper surface of the block member 11, and the guide groove 15 of a polishing holder arm 14 and the mounting hole 17 of a rotational shaft 16 are formed horizontally. The configuration of the primary polishing force applying unit A is shown in FIG. 2 and the detailed inside structure thereof is shown in FIG. 3. The block member 11 is provided with a screw rod 18 to be engaged with the screw hole 13, a knob 19 disposed integrally with the screw rod 18 and adjusting a polishing force and a horizontally rotatable rotational nut 21 on which a pin 20 for horizontally applying the polishing force to an outside diameter surface is mounted. A coil-shaped spring 22 is inserted between the polishing force adjusting knob 19 and the rotational nut 21. These components are assembled as shown in the figure and attached to the stepped hole 12 and the screw hole 13. The screw rod 18 is fixed by a lock bolt 23.

The polishing holder arm 14 can be jumped upward and rotated at least 90° from an approximately horizontal position. The polishing holder arm 14 is guided by the guide groove 15. The upper surfaces 24, 25, 26 of the polishing holder arm 14 (refer to FIG. 2) serve as secondary polishing force adjusting surfaces.

An inserting hole 30 for a shaft 27 is formed to a position near to the right side of the polishing holder arm 14 and the shaft 27 having an extreme end 28 chamfered to a round shape is inserted thereinto. The head portion of the shaft 27 is arranged as a knob 29. A rectangular key block 31 is secured to the lower portion of the shaft 27 and can be horizontally rotated by the upper knob 29.

Figure 4:
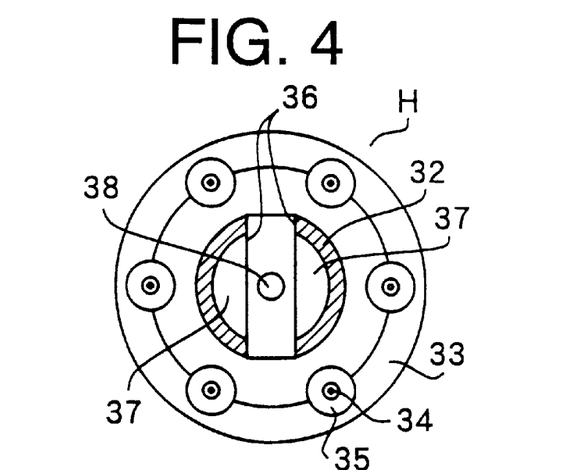
FIG. 4 is a plan view of a polishing holder of the apparatus of the embodiment.
Figure 5:
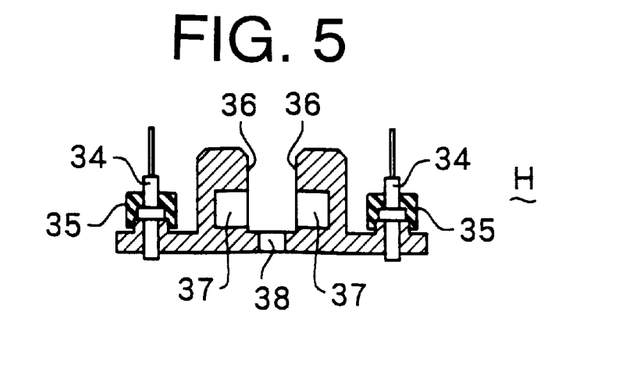
FIG. 5 is a side sectional view of the polishing holder of the apparatus of the embodiment.

FIG. 4 is a plan view of a polishing holder H of the apparatus of the embodiment and FIG. 5 is a rear sectional view of the polishing holder H of the apparatus of the embodiment. The polishing holder H has a cylindrical section 32 disposed at the center thereof and adapters 35 as many as a plurality of ferrules with optical fibers 34 disposed on the same radius of the thin outside edge section 33 of the disc member thereof so that the ferrules are attached to the adapters 35. A U-shaped mounting/guiding groove 36 is formed longitudinally to the cylindrical section 32 at the center of the polishing holder H. The mounting/guiding groove 36 receives the extreme end of the polishing holder arm 14. A peripheral groove 37 is formed in the interior of the cylindrical section 32 at the center of the polishing holder H so as to communicate with the interior orthogonally to an axis. A center hole 38 is formed at the center of the polishing holder H so that it is engaged with the extreme end 28 of the shaft 27. A positioning pin (refer to FIG. 1 and FIG. 2) is disposed to the polishing holder arm 14 to regulate the relationship between the polishing holder arm 14 and the polishing holder H.

A polishing force applied to the polishing holder H is adjusted by the following procedure. In FIG. 1, the rotational nut 21 is rotated rightward to locate the pin 20 for applying the polishing force at a position $P_2$ and a regular polishing force is initially set by the polishing force adjusting knob 19. However, since the regular polishing force is excessive in an adhesive removing process as described above, adhesive removal polishing is performed by rotating and moving the pin 20, for applying the polishing force to a position $P_1$ where a step is previously lowered so that the polishing force is made to a fraction of the regular polishing force.

Since a polishing time necessary to remove an adhesive is about 10 seconds, the polishing process can be successively shifted from the adhesive removal polishing process to a final polishing process because the regular polishing force can be applied by rotating and moving the pin 20 to the position $P_2$ by further rotating the rotational nut 21 after the completion of the adhesive removal polishing process. In the embodiment, two steps are formed to the polishing holder arm 14 and positions are shown up to a position $P_3$. However, when the number of steps is increased by further dividing them, the fine adjustment of the polishing force necessary to adjust the radius of curvature of a spherical surface and to enhance the optical characteristics of a polished surface can be carried out only by moving the position where the pin 20 for applying the polishing force is located. In addition, a secondary polishing force adjusting member that has the number and height of steps which are set depending upon the application of the polishing apparatus may be separately prepared and mounted on the polishing holder arm 14.

Figure 6:
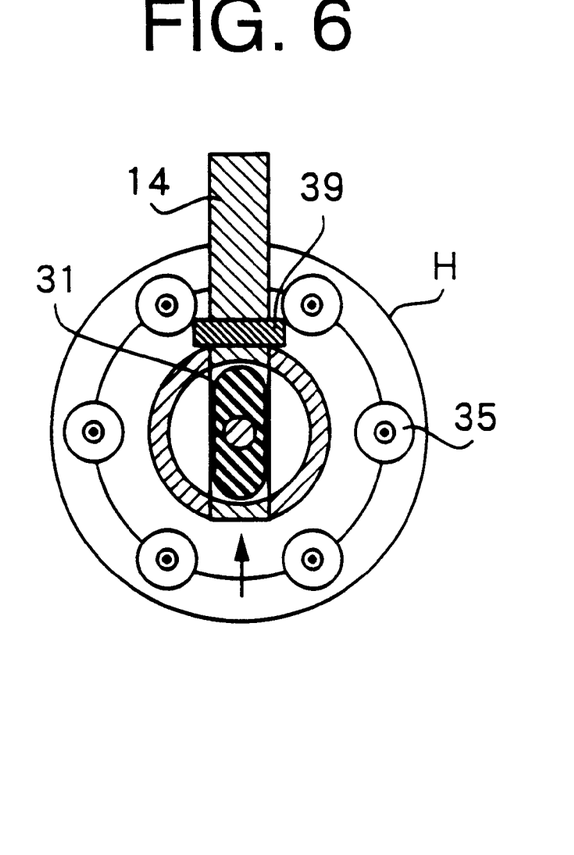
FIG. 6 is a plan view showing a state that the polishing holder is inserted into a polishing holder arm in the apparatus of the embodiment.
Figure 7:
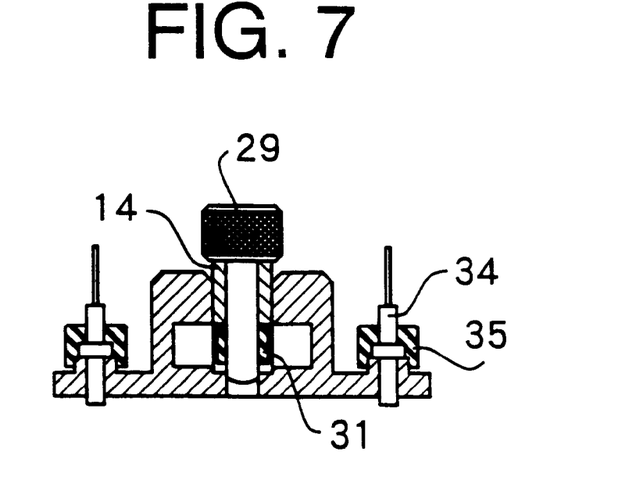
FIG. 7 is a rear sectional view showing the state that the polishing holder is inserted into the polishing holder arm in the apparatus of the embodiment.
Figure 8:
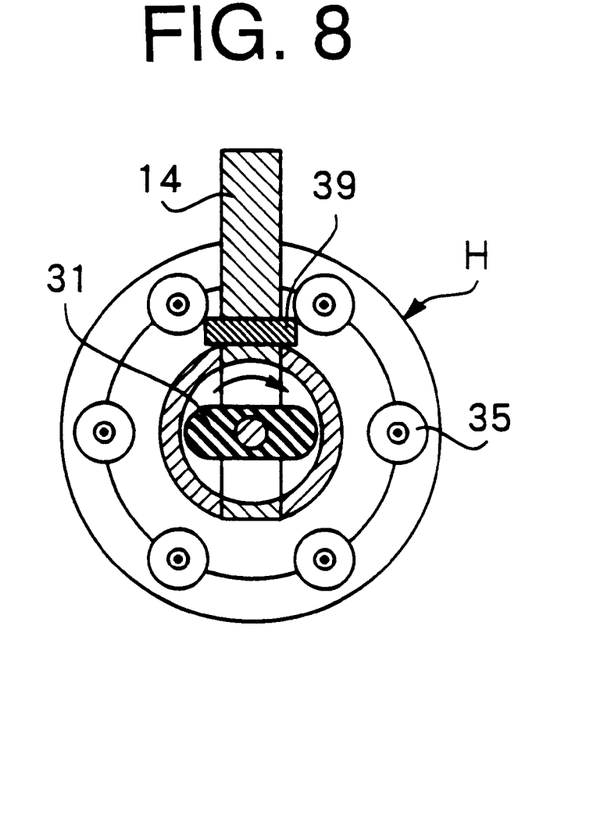
FIG. 8 is a plan view showing a state that the polishing holder is mounted on the polishing holder arm in the apparatus of the embodiment.
Figure 9:
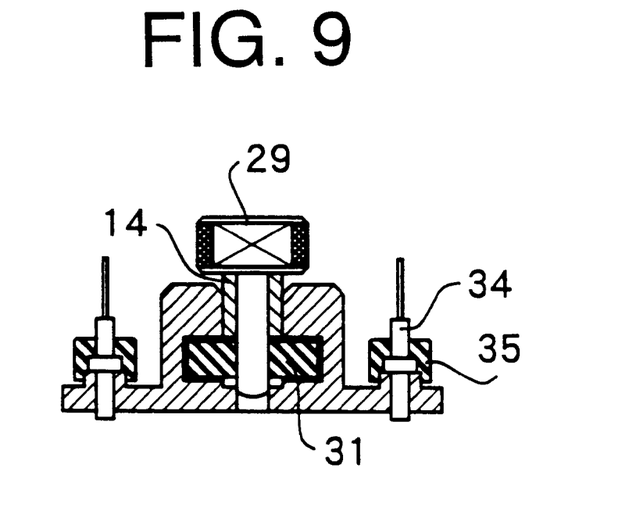
FIG. 9 is a rear sectional view showing the state that the polishing holder is mounted on the polishing holder arm in the apparatus of the embodiment.

Next, a mechanism for mounding and dismounting the polishing holder H used to the embodiment of the optical fiber end surface polishing apparatus according to the present invention on and from the polishing holder arm will be described with reference to FIG. 6 to FIG. 9. FIG. 6 is a plan view showing a state that the polishing holder H is inserted into the polishing holder arm in the apparatus of the embodiment, FIG. 7 is a rear sectional view showing the state that the polishing holder is inserted into the polishing holder arm in the apparatus of the embodiment, FIG. 8 is a plan view showing a state that the polishing holder is mounted on the polishing holder arm in the apparatus of the embodiment, and FIG. 9 is a rear sectional view showing the state that the polishing holder is mounted on the polishing holder arm in the apparatus of the embodiment. As shown in FIG. 6 and FIG. 7, the knob 29 is rotated and the long side of the key block 31 is made parallel to the polishing holder arm 14 previously to mount the polishing holder H on the polishing holder arm 14. In this state, both the inside surfaces of the mounting/guiding groove 36 of the polishing holder is fitted to both the outside surfaces of the polishing holder arm 14 and the polishing holder is pushed inwardly in parallel therewith until it comes into contact with the positioning pin 39 of the polishing holder arm.

FIG. 8 and FIG. 9 show the state that the polishing holder H is mounted on the polishing holder arm 14. At the time, the knob 29 is rotated 90° from the state shown in FIG. 6 and FIG. 7 so that the long side of the key block 31 is engaged with the peripheral groove 37 of the polishing holder H at right angles as shown in the figures. With this operation, the polishing holder H can be simply and securely mounted on the polishing holder arm 14. To remove the polishing holder H from the polishing holder arm 14, it suffices only to rotate the knob 29 forwardly and reversely to attain the state shown in FIG. 6 and FIG. 7. Note, a not shown click stop unit composed of a bolt containing a spring or the like may be mounted to prevent a slip motion of the key block 31 caused by vibration and shock regardless of that it is not desired by an operator.

Figure 10:
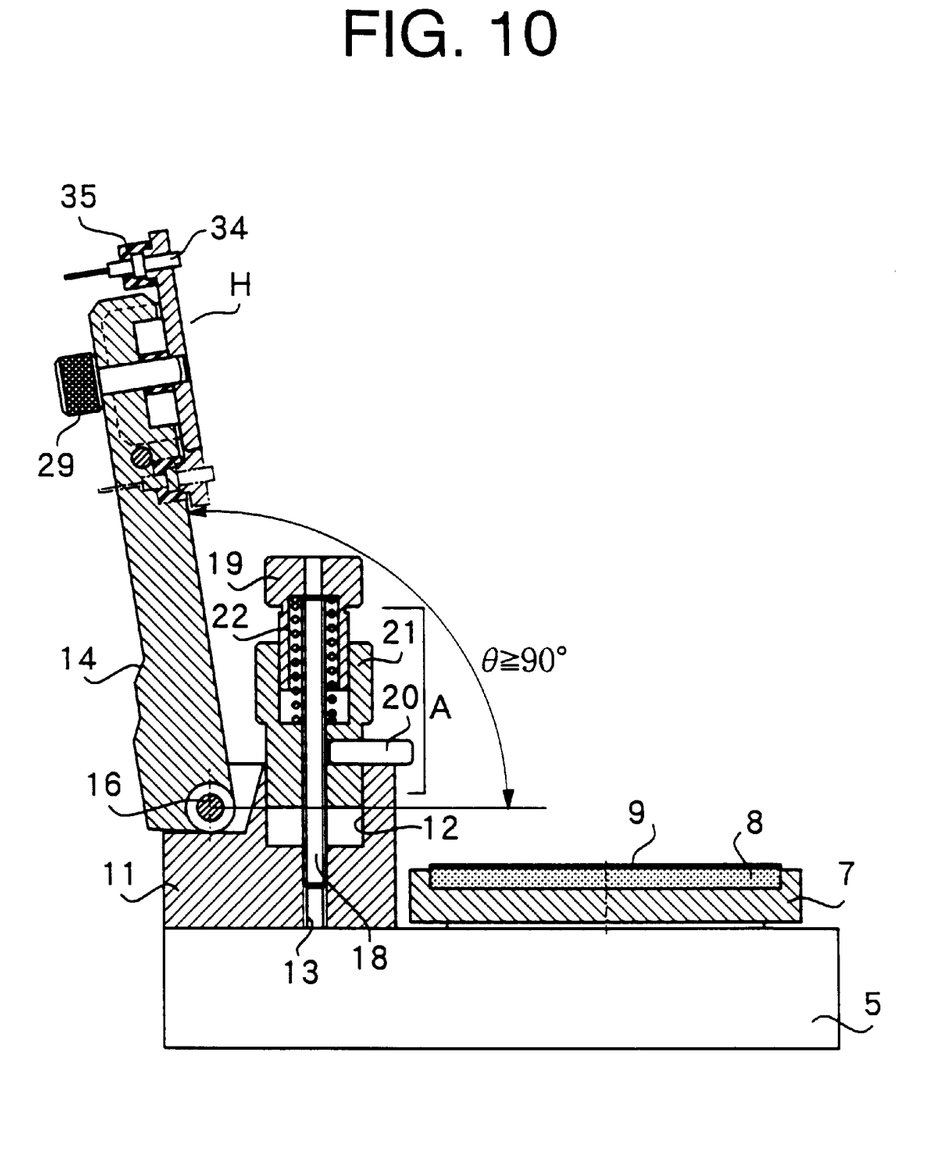
FIG. 10 is a side sectional view showing a state that the polishing holder arm on which the polishing holder is mounted is jumped up in the embodiment.

FIG. 10 is a side sectional view showing a state that the polishing holder arm on which the polishing holder H is mounted is jumped up in the embodiment of the optical fiber end surface polishing apparatus according to the present invention. That is, when the pin 20 is moved to a position of origin $P_0$ by rotating the rotational nut 21, the polishing holder arm 14 can be freely jumped up manually in a state that the polishing holder H is mounted. According to the experiment executed by the inventors of the present invention, it has been confirmed that a visual check to the end surface of an optical fiber and cleaning of a polished end surface can be more easily carried out when a jumping-up angle θ is set slightly larger than 90°.

Figure 11:
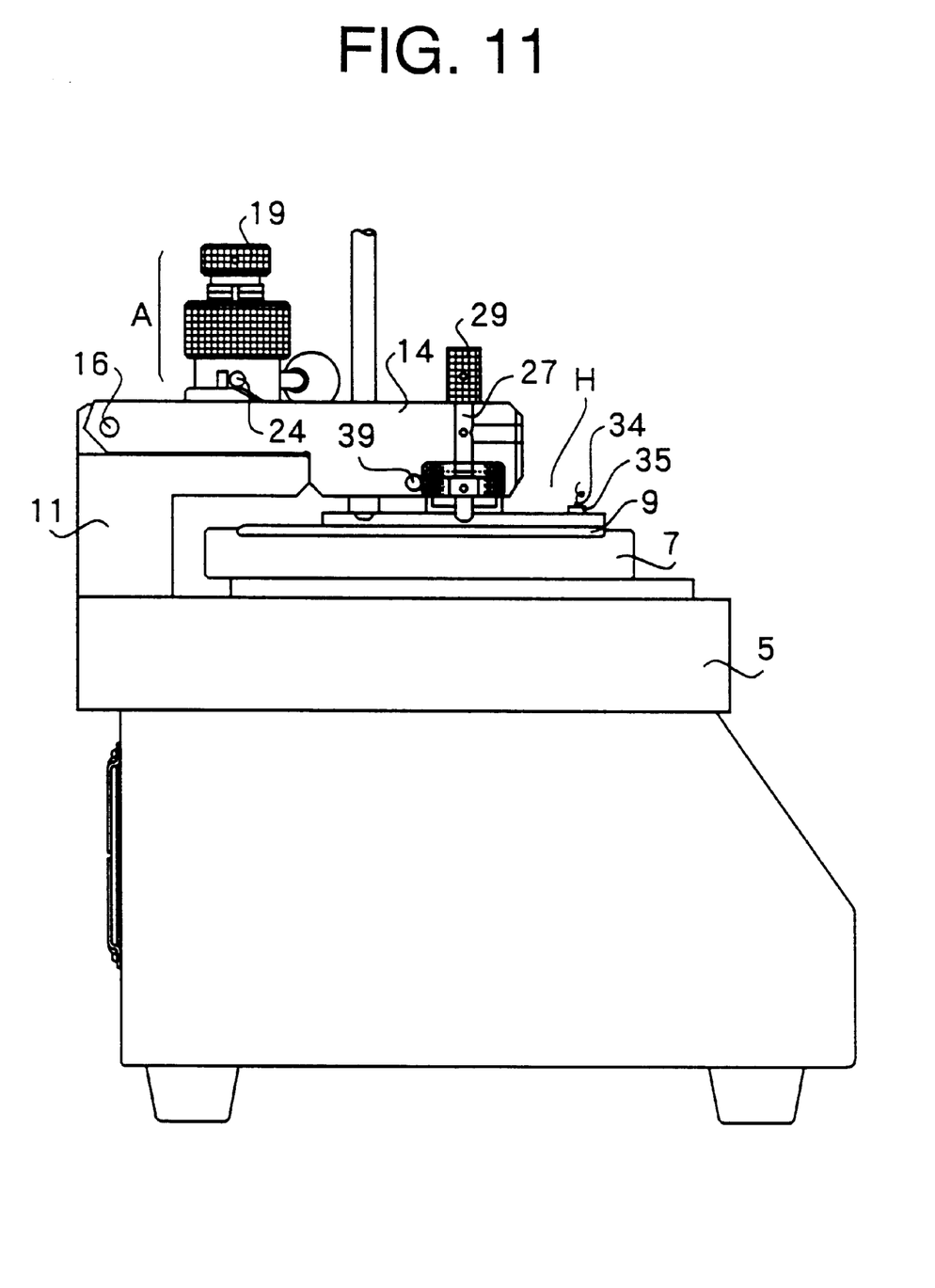
FIG. 11 is a side elevational view showing an embodiment which more specifies the above embodiment.

Next, an embodiment which more specifies the above embodiment will be described in detail with reference to FIG. 11. In the specified embodiment, the same numerals as used in the aforesaid embodiment are used to denote components having the same functions. The embodiment is an optical fiber end surface polishing apparatus composed of an optical fiber holder H on which a plurality of optical fiber connector ferrules 34 are secured and supported thereby and a turntable 7 on which a polishing film 9 for polishing connector end surfaces in confrontation with the polishing holder H and an elastic disc 8 are placed. A pressurizing mechanism A of the apparatus includes a holder support shaft 27 for supporting and pressurizing the holder H at the center thereof and an arm 14 for supporting the shaft 27 at one end thereof and the other end of the arm 14 is connected to a member 11 which is arranged integrally with a base through a rotational shaft 16 to permit the arm 14 to rotate upward and downward at least 90°.

The holder support shaft 27 is rotatably supported by a bearing at an end of the arm. A knob 29 and a clamp are attached to the holder support shaft 27 integrally therewith. The holder H can be mounted and dismounted by engaging the clamp with the inner peripheral groove of a projection located at the center of the holder H and rotating it 90°. Two high and low arm pressurizing sections which are formed continuously on an inclined surface are disposed to a midpoint of the arm 14 to permit a polishing force to be successively changed at two steps. The arm can be pressurized by moving a pin 20 to the pressurizing section by the operation lever of the pressurizing mechanism A. An amount of pressure is changed by selecting any one of the two high and low pressurizing sections and locating the pin 20 at the selected section. The pressurizing mechanism A is composed of a pressurizing cylinder which is disposed in the vicinity of the pressurizing section, provided with a pin 20 and the operation lever and can slide upward and downward, a pressurizing spring 22 and a pressure adjusting knob 19 passing therethrough.

Since the optical fiber end surface polishing apparatus according to the present invention is arranged as described above, the apparatus can solve all the problems of the conventional polishing apparatus. The arrangement of the apparatus permits the polishing holder arm to be jumped upward and rotated at least 90° from an approximately horizontal position together with the polishing holder to which the ferrules with the optical fibers are attached. With this arrangement, a troublesome job for mounting and dismounting the polishing holder is made unnecessary in each polishing process as well as the exfoliated abrasive grains and polished chips deposited on the extreme end surface of a ferrule can be removed and cleaned in a state that the polishing holder is mounted on the polishing holder arm and at the same time a polished surface can be visually checked as a mid-process inspection.

What is claimed is:

1. An optical fiber end surface polishing apparatus composed of a polishing device surface turning by being supported by a base plate, a holder for supporting a plurality of optical fiber ferrules, a polishing holder arm capable of moving relative to the polishing device surface while supporting the holder and a polishing force applying device for applying a pressure for making the ferrules to come into contact with the polishing device surface under pressure through the polishing holder arm, wherein:

the polishing holder arm includes a polishing holder mounting/dismounting device having a base section supported by the base plate through a horizontally rotational shaft to permit the device to rotate and move upward from an approximately horizontal position and the other end section engaged with the polishing holder;

the holder includes a coupling section whose rotation is restricted by the polishing holder arm and which is detachably coupled with the polishing holder mounting/dismounting device at a center; and the polishing force applying device includes polishing force applying means which moves between a position where it applies a downward spring urging force to the polishing holder arm and a position where it permits the polishing holder arm to rotate and move upward.

2. An optical fiber end surface polishing device according to claim 1, wherein the polishing holder is composed of a stepped disc member having a cylindrical section formed at the center thereof, adapters disposed on the same radius of the thin outside edge section formed to the stepped disc member for attaching the plurality of optical fiber ferrules thereto, an U-shaped mounting/guiding groove formed longitudinally to the interior of the cylindrical section and a peripheral groove formed to the interior of the cylindrical section at angles to an axis and communicating with the mounting/guiding groove.

3. An optical fiber end surface polishing device according to claim 1, wherein the polishing holder arm includes the polishing holder mounting/dismounting device which can be jumped upward and rotated at least 90° from the approximately horizontal position through the horizontally rotational shaft disposed to an end of a rectangular member mounted on the base plate and detachably mount the polishing holder thereon through the rotational key at the other end thereof which is engaged and disengaged with and from the peripheral grove of the polishing holder.

4. An optical fiber end surface polishing device according to claim 1, wherein the polishing force applying device includes a block member mounted on the upper surface of the base plate and having a vertical stepped hole and a vertical screw hole formed coaxially to the upper surface of the block member, a polishing force adjusting knob having a rod disposed to the axial center thereof and engaged with the screw hole, a rotatable nut having a polishing force applying pin horizontally disposed to the outside diameter surface thereof and capable of rotating horizontally and a compressed coil spring interposed between the polishing force adjusting knob and the rotational nut and the assembly of these components is attached to the stepped hole and the screw hole.

5. An optical fiber end surface polishing device according to claim 4, wherein the polishing force applying device is arranged such that a mounting/guiding groove and a horizontally rotating shaft hole are formed to the polishing holder arm, the polishing holder arm is attached to the mounting/guiding groove as well as the polishing force applying pin is engaged with any one of a plurality of steps on the adjusting surface formed on the upper surface of the polishing holder arm.

\* \* \* \* \*